United States Patent Office 3,521,991
Patented July 28, 1970

3,521,991
PROCESS OF TREATING JUTE FOR IMPARTING IMPROVED LIGHT-FASTNESS
Anil Bhusan Sen Gupta and Sachindra Kumar, Calcutta, West Bengal, India, assignors to Indian Jute Industries' Research Association, West Bengal, India
No Drawing. Continuation-in-part of application Ser. No. 706,647, Feb. 19, 1968. This application Mar. 4, 1969, Ser. No. 804,317
Int. Cl. D06l 3/06
U.S. Cl. 8—108         5 Claims

ABSTRACT OF THE DISCLOSURE

Improving the light-fastness of jute and reducing surface hairiness by contacting the jute with moist chlorine gas, aqueous chlorine solution or aqueous solution of hypochlorous acid and thereafter extracting the jute with aqueous solution of alkali metal hydroxides, phosphates, sulphites or bisulphites.

---

This application is a continuation-in-part of application Ser. No. 706,647, filed Feb. 19, 1968, now abandoned.

This invention relates to the treatment of jute which imparts to the material a significant improvement in light-fastness and also provides a cleaner surface with much less fiber shedding, to extend its use particularly after bleaching to furnishing fabrics like draperies, wall coverings, and upholsteries.

Jute is a very useful fiber possessing a high strength and dimensional stability, and is principally utilized in the manufacture of coarse and loosely woven fabrics and bags. It is also used extensively as wrapping and packing materials, where color is of no importance. In recent years, however, consideration has been given to the use of jute for the manufacture of decorative and furnishing fabrics which appear to have a good market potential. The main drawback of the fiber, which is responsible for its limited use in this field, is that of discoloration due to development of yellow to brown color, after sufficient exposure to light. The phenomenon of discoloration which is confined to the surface layer only, is commonly known as yellowing which is exhibited by jute, either unbleached or bleached by any of the conventional methods.

The main structural unit of jute, a typical member of the bast fiber group, is cellulose which occurs in intimate association with hemicellulose and lignin. The fiber filaments are known to be composed of a number of individual biological cells forming a bundle (10–30 cells) and the lignin component is believed to be located mainly in the middle lamella and also in the primary wall as well as in the outer region of the secondary cell-walls. Extensive work carried out on this fiber by various workers reveals that the yellowing exhibited by jute on exposure to light is mainly due to the presence of lignin. A careful removal of this component, up to about 90–92%, by the action of a delignifying agent without disturbing the hemicellulosic fraction does not decrease the yellowing to an appreciable extent. A further removal treatment brings about a marked reduction in the extent of discoloration, but with tde result that although the dry strength remains more or less unaffected, the strength of the material in wet state is reduced to such a low value that it tends to disintegrate, thereby losing almost all its importance as a textile fiber. If, on the other hand, the removal of lignin is accompanied by a partial elimination of hemicellulose, a simultaneous reduction in both dry and wet strengths occurs, the extent of the loss being dependent on the degree of removal of these two components. The bleaching of jute by conventional methods is aimed at the production of a good white product with a minimum effect on the fiber components so as to retain the maximum possible strength, and owing to the presence of lignin, such a product always undergoes a marked yellowing on exposure to light The bleached or unbleached material when dyed also shows a marked discoloration on exposure to light due to change in the background color, though the dyestuff itself may not always be affected under the same conditions of exposure. This disadvantage of the high light-susceptibility has for many years limited the use of jute as a versatile decorative and furnishing fabric, where the stability of color is of great importance.

Jute fiber being relatively coarse and stiff is not easily amenable to twist, as a result of which some of the fiber filaments tend to come out of the surface of yarn causing hairiness which persists even in the fabric stage. This hairiness represents a specific disadvantage for the fabric intended to be used as a decorative material, since the presence of these protruding fibers is considered to be mainly responsible for fiber shedding in the course of practical use. The removal of these protruding fibers by mechanical means including cropping or by singeing is difficult and rarely satisfactory.

An object of this invention is to provide a suitable process for treating jute for imparting a high resistivity against light, which will not be lost even after bleaching the material by the usual conventional methods.

Another object of the invention is to remove surface hairiness of the fabric so as to provide a cleaner surface with a reduced tendency for fiber shedding.

The above objectives can be achieved by a chemical treatment where a reaction is confined to the surface layer of the fabric only, and the lignin component of the inner layers remains substantially undisturbed, so as to provide a fabric with adequate strength, both dry and wet. The conditions of treatments are adjusted so that the portion of lignin present in the surface layer, which constitutes only a small fraction of the total liginin and is also responsible for yellowing, is preferentially removed, while the major portion of lignin occurring in the inner layers remains practically unaffected.

According to this invention the removal of lignin, mainly from the surface layer of jute fabric, is effected by the action of an aqueous solution of acid hypochlorite, an aqueous solution of chlorine or moist chlorine gas, because chlorine and chlorine-yielding compounds delignify jute at a very rapid rate. Although under the conditions of treatment, the reaction is predominantly at the surface layer, due to diffusion of the chemicals the reaction proceeds to a considerable extent to the surface layers of the individual fiber filaments constituting the yarns of the fabric as well. The treated fabric is associated with insoluble chloro-derivatives of lignin, and on washing with water it assumes yellowish brown color. On further extracting the material with solution of an alkali metal salt as described hereinafter, with a view to solubilizing the chloro-derivatives of lignin, followed by water washing, the fabric turns light brown in shade which does not exhibit practically any change in color after 40 hours exposure to light in a Carbon-arc Fade-Ometer (Atlas Electric Devices Co.). The material having its surface layer now practically free from lignin and possessing a remarkable stability towards light can be bleached by any conventional method without an undue loss in strength and also not appreciably affecting its resistivity against yellowing on exposure to light.

Since light fast unbleached material is not particularly suitable for dyeing to pastel shades, it is desirable that the stabilized material should be bleached prior to dyeing.

As a result of light stabilizing treatments, a relatively small portion of lignin (about 25%) occurring mainly on the surface layer of the fabric and to a certain extent on the fiber filaments constituting the individual yarns is removed, while the major portion remains intact in the material.

According to this invention thus the jute can be treated for imparting a high resistivity against discoloration on exposure to light by a two stage process; the treated jute even after bleaching by conventional methods exhibits a high degree of light-fastness. The first stage consists in treating jute fabric with acid hypochlorite solution or chlorine gas or its aqueous solution, and the second in extracting the so treated product with a solution of alkali metal hydroxides, phosphates, sulphites or bisulphites to induce light resistivity.

Investigations carried out for the development of preferred conditions described in this invention reveal that a marked improvement in light-fastness of jute is obtained on treating the material with an acid hypochlorite solution containing about 5–10 available chlorine based on the weight of the jute being treated. The particular concentration of the solution can vary widely as can the amount of solution applied to the fabric, but the total amount of the available chlorine in the solution should be about 5–10% by weight based on the weight of the fabric being contacted. It has been found suitable to utilize a liquor ratio of solution to fabrics of about 10:1 with the solution having a concentration of available chlorine of about 0.5–1%, but these limitations, of course, may be varied. When using aqueous acid hypochlorite solution the time of treatment is preferably about 5–15 minutes. On reaction of jute with hypochlorite the pH of the solution tends to decrease rapidly due to formation of acidic products mainly hydrochloric acid arising out of the action of chlorine on the lignin component. On using neutral (pH 7) or even slightly alkaline (pH 8) sodium hypochlorite, the pH of the solution changes to the acidic side within a few minutes of treatment. The hypochlorous acid solution is prepared by conventional acidification of a calcium or sodium hypochlorite solution with, e.g. dilute hydrochloric acid. The pH of the solution should be adjusted to about 6, i.e. 6±0.2. When contacting this solution with the jute the initial pH of about 6 will drop to about 3 and these conditions are preferred because the resulting product after bleaching by conventional methods exhibits a very high light-fastness. A rigorous control of the pH of acid hypochlorite solution with acetic acid-acetate buffer at a pH level of 6 and 5 has been found to yield a product of lower light-fastness than that obtained with an unbuffered solution of hypochlorite at pH 6.

When utilizing the aqueous chlorine solution or treating with moist chlorine gas, e.g. by contacting water impregnated jute with chlorine gas, the time of treatment generally is less than that employed with hypochlorous acid solution. A treatment time of about 2–10 minutes is preferred. The aqueous solution of chlorine preferably has a pH of about 3.

Regardless of the treating agent in the first step of this process it has been found that the preferred temperature is ambient temperature, e.g. 20–40° C., and even more preferred 25–30° C.

Following the above described treatment the jute is preferably washed with water and thereafter treated by the second step of this process. This comprises extracting the treated jute with an aqueous solution of sodium or potassium hydroxides, phosphates, sulphites or bisulphites for a period of about 5–20 minutes. The temperature of treatment may be varied, but a temperature range of about 60–85° C. is preferred.

Of the above compounds named for use in the second treatment step, sodium sulphite is preferred and when using the sulphite salt, it is employed in an amount of about 2.5 to 10% based on the dry weight of the jute being treated, or preferably an amount of 2.5 to 5%. When employing the other named alkali metal salts it is preferred that the amount of the salt be about 5–10% based on the dry weight of the jute. In these cases treatment times of about 5–10 minutes are generally preferred. As was the case in the first treatment step of the above described process the exact concentrations of the solutions and the ratio of liquor to jute can be varied widely as long as the above limitations regarding amount of compound per weight of jute are observed.

After this second treatment the material is washed with water and if desired may be bleached.

Of the different chemicals used for treating the chlorinated jute, sodium sulphite is found to produce the best effect from the point of view of light-fastness and of better maintenance of strength. Treatment can be carried out with 0.25% to 1% solution of sodium sulphite, using a liquor ratio of 10:1, for 5–20 minutes. The material on being washed with water, if desired, may be bleached by a conventional method using an alkaline solution of hydrogen peroxide or sodium hypochlorite for obtaining the required degree of whiteness. The bleaching may be effected either immediately after the treatment just referred to or at any desired interval of time.

The invention is further illustrated by the following examples in which properties of the samples have been studied after bleaching by a conventional method using an alkaline solution of hydrogen peroxide or sodium hypochlorite, since the extent of improvement in light-fastness can be better assessed in the bleached state. These examples are given by way of illustration and not of limitation:

EXAMPLE I

Five strips of a good quality jute fabric, each 10-in. wide and 20-ft. long (approx. 550 gm.), were separately treated with acid hypochlorite solution, using a liquor ratio of 10:1, in a laboratory open-type jigger, the time of traverse of fabric from one end to the other being 30 seconds. The acid hypochlorite solution was prepared by acidifying the alkaline sodium hypochlorite solution with dilute hydrochloric acid until the pH of the solution was brought down to 6, and its av. chlorine concentration was adjusted to 0.7% by dilution. The treatment with hypochlorite solution was carried out at room temperature (25°–30° C.) by allowing the fabric to run, back and forth, for 7 minutes, when the pH of the solution decreased to about 3, and 95% of the av. chlorine was consumed by the fabric. On allowing the liquor to drain off, the fabric was washed twice with cold water, in each washing operation the material being run twice in each direction. The individual samples were next extracted separately with 1% solution of different chemicals with a liquor ratio of 10:1 at 80°–85° C. for 15 minutes. The bath was dropped, fabric washed twice with cold water as before and bleached with 1-vol. hydrogen peroxide solution, containing 1% sodium silicate and 0.25% trisodium phosphate, using a liquor ratio of 10:1, at 70°–75° C. for one hour. The bleached material was washed twice with tap water, once with water neutralized with acetic acid and dried in the air.

The extent of improvement in color of the samples was ascertained by measuring the brightness index in a Photovolt Reflection Meter, using a tristimulus green filter. The light-fastness was determined on exposing the samples in the Fade-Ometer and comparing the extent of discoloration with that of standard dyed samples according to AATCC method. The results obtained are given in Table I.

TABLE I.—EFFECT OF EXTRACTION OF CHLORINATED MATERIAL WITH DIFFERENT CHEMICALS (1%) ON THE BLEACHED FABRIC

| Chemical used in extraction | Brightness index | Light-fastness (grade) |
|---|---|---|
| Sodium sulphite | 56 | 4–5 |
| Sodium bisulphite | 42 | 4–5 |
| Caustic soda | 53 | 5 |
| Trisodium phosphate | 56 | 4–5 |
| Tetrasodium pyrophosphate | 50 | 4–5 |

The results of Table I show that extraction of the chlorinated fabric with sodium bisulphite (1%) produces on bleaching a shade much inferior to those prepared by extraction with other chemicals. Light-fastness of the samples prepared by extraction with different chemicals are more-or-less the same, while that of the sample bleached only by the conventional hydrogen peroxide method was found to be much less (of the order of 1–2). The use of sodium sulphite is, however, preferred as an extracting chemical for higher retention of the tensile strength. The sulphite extracted material showed a loss in dry strength of about 10% and in wet strength of about 44%, while on using other alkali metal salts, the loss in dry strength was of the order of 13–20% and that of wet strength of 40–58%. The loss in wet tensile strength of the untreated grey fabric was found to be about 15%.

EXAMPLE II

The procedure of Example I was repeated with three strips of samples (10" x 20' each) except that 0.5% solutions of alkaline chemicals were used for extracting the chlorinated materials. The brightness index, light-fastness and loss in tensile strength of the bleached samples are given in Table II.

TABLE II.—EFFECT OF EXTRACTION OF CHLORINATED MATERIAL WITH DIFFERENT CHEMICALS (0.5%) ON THE BLEACHED FABRIC

| Chemical used in extraction | Brightness index | Light-fastness (grade) | Loss in tensile strength, percent | |
|---|---|---|---|---|
| | | | Dry | Wet |
| Sodium sulphite | 54 | 4–5 | 10 | 40 |
| Caustic soda | 52 | 4–5 | 13 | 58 |
| Tetrasodium pyrophosphate | 43 | 4–5 | 30 | 51 |

The bleached product prepared by extraction with 0.5% sodium sulphite solution (Table II) is similar in properties to that obtained on extraction with 1% sulphite solution as described in Example I, but superior to those produced by extraction with 0.5% solution of caustic soda or tetrasodium pyrophosphate.

EXAMPLE III

Eight strips of fabric (10" x 20' each) were separately treated in the jigger with acid hypochlorite (pH 6; liquor ratio 10:1) containing varying concentrations of av. chlorine for 7 minutes, when 90–96% of av. chlorine was used up. The samples on being twice washed with water were extracted separately with 1% solution of sodium sulphite followed by bleaching with hydrogen peroxide as described in Example I. Test results of the samples are given in Table III.

TABLE III.—EFFECT OF CONCENTRATION OF ACID HYPOCHLORITE ON THE BLEACHED FABRIC

| Conc. of av. chlorine (percent) | Brightness index | Light-fastness (grade) |
|---|---|---|
| 0.20 | 60.0 | 3 |
| 0.25 | 60.5 | 3 |
| 0.30 | 59.7 | 3–4 |
| 0.35 | 57.0 | 3–4 |
| 0.40 | 58.5 | 3–4 |
| 0.50 | 57.0 | 4–5 |
| 0.70 | 56.0 | 4–5 |
| 1.00 | 54.0 | 5–6 |

The results obtained (Table III) demonstrate that products with higher light-fastness are obtained on treatment with solution of acid hypochlorite having av. chlorine concentration of 0.5% or more. Although the loss in dry strength of the materials prepared by the action of solutions of 0.5% or higher concentrations of av. chlorine was reasonably low (10–12%), that in wet strength increase to about 58% on using solution of 1% av. chlorine.

EXAMPLE IV

Five strips of fabric (10" x 20' each) were separately treated in the jigger with acid hypochlorite solution (pH 6; liquor ratio 10:1) of 0.7% av. chlorine for 7 minutes. Each of the treated materials was washed twice with water and then extracted with different concentrations of sodium sulphite solution for 15 minutes followed by bleaching with hydrogen peroxide according to procedure described in Example I; the summary of the test results is given in Table IV.

TABLE IV.—EFFECT OF EXTRACTING CHLORINATED PRODUCT WITH DIFFERENT CONCENTRATIONS OF SODIUM SULPHITE SOLUTION ON THE BLEACHED FABRIC

| Conc. of sodium sulphite (percent) | Brightness index | Light-fastness (grade) | Loss in tensile strength (percent) | |
|---|---|---|---|---|
| | | | Dry | Wet |
| 1.0 | 56 | 4–5 | 13 | 45 |
| 0.7 | 56 | 4–5 | 6 | 43 |
| 0.5 | 55 | 4 | 4 | 40 |
| 0.25 | 56 | 4 | 9 | 37 |

Results of Table IV show that there is no appreciable difference in whiteness and light-fastness of the samples prepared by varying the concentrations of sulphite solution within the range of 0.25%–1%.

EXAMPLE V

Two strips of fabric (10" x 40' each, weighing 1100 gms.) were subjected to two successive treatments with acid hypochlorite solution (pH 6) of 0.7% av. chlorine, using a liquor ratio of 5:1, for 14 minutes when 92–95% of the av. chlorine was consumed, the material being washed twice with water as in Example I. One of the strips was treated with 0.5% sulphite solution at a liquor ratio of 10:1 and the other with 1% sulphite solution, at a liquor ratio of 5:1, both being finally bleached with 1-vol. hydrogen peroxide followed by washing with water.

Improvement in shade and light-fastness as well as loss in tensile strength were practically the same in both samples and the results of these samples were found to be almost similar to those of the products obtained in Example IV.

EXAMPLE VI

Two strips of fabric (10" x 40' each) were subjected to two successive treatments with acid hypochlorite solution as described in Example V and washed twice with cold water and then extracted with 1% sulphite solution at a liquor ratio of 5:1 as described earlier. One of the samples was washed twice with hot water (60°–70° C.) and the other with cold water, both the samples being finally bleached with hydrogen peroxide as usual. The former sample showed a whiter shade (Brightness Index 58) compared with the latter (Brightness Index 54) as well as the products of the foregoing examples. The light-fastness of the two samples, however, remained practically unaffected by the change in the conditions of the washing procedure.

EXAMPLE VII

One strip of the fabric (10" x 40') was treated twice with acid hypochlorite solution, extracted with sodium sulphite solution and washed with hot water by following the procedure of Example V. The fabric was then bleached with sodium hypochlorite containing 1.5% av. chlorine, maintained at a pH value 9.6 by the addition of soda ash, using a liquor ratio of 5:1 for 40 minutes, washed thrice with cold water as in Example I. The sample, possessing a brightness index of 53, is slightly inferior to the corresponding sample bleached with hydrogen peroxide solution (Example V) in whiteness, but in light-fastness and strength values both of them compare favorably with each other.

EXAMPLE VIII

Three strips of fabric each of 6" x 12" (weighing 16 gms.) were treated with water, squeezed to 100% imbibition, and then treated separately with chlorine gas in a glass chamber (11" x 6" x 22") previously saturated with chlorine gas at room temperature (20°–30° C.). Throughout the period of treatment the gas was allowed to pass in a slow stream through the vessel. The treatments of the samples with chlorine were carried out for 3, 5 and 10 minutes, after which each of the samples of fabric was extracted separately with 1% sodium sulphite solution (liquor ratio 10:1) for 15 minutes at 80°–85° C., washed twice with hot water and bleached with 1-Vol. hydrogen peroxide solution as in Example I. The improvement in shade of the samples was found to decrease slightly with the increase in time of treatment with chlorine. Light-fastness of the products, on the other hand, progressively increased from 4 to 5 with the extended periods of treatment with chlorine.

As indicated in the examples, the fabric treated by the process of this invention followed by bleaching with a conventional method using hydrogen peroxide shows a very faint discoloration after 10 to 15 hours of exposure in the Fade-Ometer, which becomes just perceptible after 20 to 30 hours of exposure. In contrast to this, the conventionally hydrogen peroxide bleached jute undergoes a significant yellowing after 2½ to 5 hours of exposure. Even after 30 hours of exposure, the extent of discoloration developed in the fabric treated by the process of the invention followed by bleaching with a conventional method using hydrogen peroxide is much less than that produced in the sample bleached by the conventional hydrogen peroxide method on exposure to light for 5 hours. Therefore, to achieve a reduction in the yellowing to such an extent as that exhibited by the sample bleached by the process of the invention followed by bleaching with any of the processes heretofore known, necessitated practically a complete removal of lignin, which invariably results in a very high loss in strength, particularly in wet state, leading to disintegration of the fabric geometry and fiber structure. A practically feasible process of removing the lignin component preferentially from the surface layer of the fabric, thereby making a lignocellulosic material like jute highly resistant to light with a cleaner surface, effected by the removal of hairiness, and at the same time retaining a greater proportion of its wet strength, is heretofore unknown.

Jute fabric treated by the process of the invention followed by bleaching with hydrogen peroxide possesses excellent dyeing characteristics and can be dyed to attractive shades of varying depths with different classes of dyestuffs, generally employed for the processing of cellulosic fibers. Owing to the attainment of much more stable background, the discoloration of the dyed fabric now depends mainly on the extent of the light susceptibility of the dyestuff itself and not on the jute used as a substrate. In other words, the fading of a dyestuff on jute bleached by the process of the invention is more nearly like that expected from the same dye on bleached cotton.

This excellent light-fastness coupled with a cleaner surface with reduced likelihood of fiber shedding afforded by this invention represents a major breakthrough of the natural limitation of this fiber with immense future possibility to extend the use of jute as a versatile textile fiber to the manufacture of decorative and furnishing materials.

The process of this invention has been developed with fabric samples and the light-fastness of the products after bleaching with a conventional method using hydrogen peroxide has been found to vary from 4 to 5 depending upon the fabric geometry as well as the quality of fiber used for its manufacture. The process of the invention is applicable to jute in any form, e.g., fiber, yarn or fabric, and to blended fabric made of jute and other cellulosic fibers. In addition, the process will be equally applicable to any other lignocellulosic fibers including mesta or kenaf, hemp, aloe and sisal, in which the presence of lignin is responsible for yellowing. Thus reference to "jute" in the specification and claims is to be construed to include the jute in any of the foregoing forms, whether blended or not as indicated above and the lignocellulosic fibers such as referred to hereinabove.

What is claimed is:

1. A process for improving the light-fastness of jute and removing surface hairiness which comprises a first step of contacting jute with a material selected from the group consisting of (1) moist chlorine gas, (2) an aqueous chlorine solution and (3) an aqueous solution of hypochlorous acid, the period of contact for (1) and (2) being about 2 to 10 minutes and the period of contact for (3) being about 5 to 15 minutes, said aqueous solution of hypochlorous acid having a pH of about 6 and containing about 5–10% available chlorine based on the weight of the jute; and a second step of extracting the so-treated jute with an aqueous solution of at least one compound selected from the group consisting of sodium and potassium hydroxides, phosphates, sulphites and bisulphites for a period of about 5 to 20 minutes, the solution or sodium or potassium sulphite containing about 2.5 to 10% of sodium or potassium sulphite based on the weight of the jute and the remaining compounds being present in solution in an amount of about 5–10% based on the weight of the jute.

2. A process according to claim 1 where in the first step the temperature is maintained at about 20–40° C.

3. Process according to claim 1 where in the second step the temperature is maintained at 60–85° C.

4. Process according to claim 1 where in the first step a solution of hypochlorous acid is employed having an initial pH of 6±0.2 and in the second step a solution of sodium sulphite is used.

5. Process according to claim 1 in which following the second step the jute is washed and bleached.

References Cited

UNITED STATES PATENTS 1,884,091   10/1932   Wilson _____ 8—108 XR
3,384,444   5/1968   Simpson et al. _____ 8—101 XR MAYER WEINBLATT, Primary Examiner U.S. Cl. X.R.

8—101

UNITED STATES PATENT OFFICE
CERTIFICATE OF CORRECTION

Patent No. 3,521,991          Dated July 28, 1970

Inventor(s) ANIL BHUSAN SEN GUPTA et al

It is certified that error appears in the above-identified patent and that said Letters Patent are hereby corrected as shown below:

The second inventor's name should read Sachindra Kumar Majumdar instead of Sachindra Kumar.

SIGNED AND
SEALED
DEC 29 1970

(SEAL)
Attest:

Edward M. Fletcher, Jr.
Attesting Officer

WILLIAM E. SCHUYLER, JR.
Commissioner of Patents

FORM PO-1050 (10-69)